United States Patent Office 3,419,504
Patented Dec. 31, 1968

3,419,504
NOVEL SUBSTITUTED 1,3,5-TRIAZATRI-PHOSPHORINES AND PROCESS FOR THEIR POLYMERIZATION
Gerald J. Klender, Bloomingdale, N.J., assignor to Uniroyal, Inc., a corporation of New Jersey
No Drawing. Filed July 13, 1964, Ser. No. 382,385
18 Claims. (Cl. 260—2)

This invention relates to novel hexa-substituted 1,3,5-triazatriphosphorines, a novel process for polymerizing these compounds, and the polymers thus formed.

The condensation polymerization of hexaethoxy-substituted 1,3,5-triazatriphosphorines by the intermolecular elimination of diethyl ether, leaving adjacent triazatriphosphorine nuclei bridged with P—O—P linkages, is described by Rätz et al., Chemische Berichte, 84,889, 896 (1951). These polymers are desecribed as being dark in color, and are also known to be of relatively low molecular weight, thermally unstable, and generally deficient in the useful mechanical properties required of polymeric materials. Redfarn, U.S. Patent 2,866,773 describes a reaction of phosphonitrilic chloride trimer (2,2,4,4,6,6-hexachloro-1,3,5-triazatriphosphorine) with polyhydroxyl aromatic compounds involving the evolution of hydrogen chloride. The polymers thus formed contain organic radicals in the principal chains, rather than being composed of completely inorganic backbones. These polymers also suffer from relatively undesirable physical properties, including dark color. C. J. Brown, J. Polymer Sci., 5, 465, 466, reports the synthesis of impure 2,2,4,4,6,6-hexaphenoxy-1,3,5-triazatriphosphorine and its self-polymerization by ring scission. Here, also, a dark polymer with certain undesirable physical properties is formed.

It is an object of this invention to form a hard clear, thermally stable, flame resistant polymer of substituted 1,3,5-triazatriphosphorines in which the principal chains are composed entirely of inorganic linkages. It is another object of this invention to form such polymers by a condensation polymerization which avoids the evolution of byproducts that are harmful to the physical properties of the polymer.

It is a further object of this invention to provide hexa-substituted 1,3,5-triazatriphosphorine compounds suitable as monomers for the formation of the aforesaid polymers. Still another object of this invention is to furnish such monomers with the number of reactive groups thereon selected to provide a controlled degree of cross-linking in the polymer.

These and other objects of this invention, which will become apparent from a reading of this specification, are achieved by preparing substituted 1,3,5-triazatriphosphorines containing blocking groups in three or four of the six positions on each nucleus capable of carrying a substituent, and at least one alkoxy group and at least one halogen group occupying the other two or three substitutable positions on each nucleus, and by heating these materials to effect their condensation polymerization.

1,3,5-triazatriphosphorines, formed by the trimerization of phosphonitrilic chloride, have the general structure

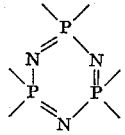

As there are two reactive sites on each phosphorus atom, the ring nucleus can contain six substituents.

By the proper selection of substituents, these compounds can be subjected to condensation reactions involving intermolecular elimination of substituents causing the phosphorus atoms of adjacent ring nuclei to become linked and a polymer to be formed. Where these internuclear linkages contain no carbon atoms, the polymers formed have backbones or principal chains which are entirely inorganic in nature. This is the nature of the polymer reported in the Rätz et al. reference cited above. However, the fact that this polymer is formed from starting material containing six reactive substituents on each 1,3,5-triazatriphosphorine nucleus has led to difficulty in preparing usable inorganic polymers by this method. If all, or even a majority, of the substituents on a nucleus are reactive in the condensation polymerization reaction, an undesirably highly cross-linked polymer results with attendant discoloration and reduction in desired physical properties.

My invention provides molecular species of hexa-substituted 1,3,5-triazatriphosphorine which serves as monomers in condensation homopolymerization reactions and which do not have this undesirable tendency toward excessive cross-linking. This is accomplished by providing compounds in which three to four of the substitutable positions are occupied by "blocking" groups which are inert in the condensation reaction, and in which the other substitutable positions are occupied by at least one alkoxy radical and at least one halo radical, which permits homopolymerization of these compounds by a condensation reaction involving the intermolecular elimination of alkyl halide and the linking of phosphorus atoms in adjacent 1,3,5-triazatriphosphorine nuclei by P—O—P linkages thusly:

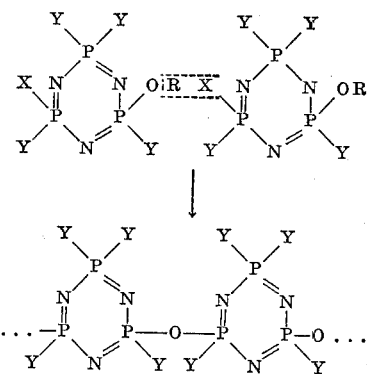

wherein P is phosphorus, N is nitrogen, O is oxygen, Y is any of the blocking groups described below, X is halogen and R is alkyl. The alkoxy substituent may contain from one to four carbon atoms, but is preferably ethoxy. The halo substituent is preferably bromo or chloro. Substituents suitable as blocking groups are phenyl groups, phenoxy groups and dialkylamino groups in which each alkyl group contains from one to four carbon atoms. Dimethylamino is the preferred dialkylamino group for this purpose.

Examples of compounds of my invention are monochloro-, monoethoxy-, tetraphenyl-1,3,5 - triazatriphosphorine; monochloro-, monoethoxy-, tetraphenoxy-1,3,5-triazatriphosphorine; monochloro-, monoethoxy-, tetra(dimethylamino)-1,3,5 - triazatriphosphorine; monobromo-, monoethoxy, tetraphenyl - 1,3,5 - triazatriphosphorine; monobromo-, monoethoxy-, tetraphenoxy-1,3,5-triazatriphosphorine; monobromo-, monoethxy-, tetra(dimethylamino)-1,3,5-triazatriphosphorine; monochloro-, monomethoxy-, tetraphenoxy-1,3,5-triazatriphosphorine; monobromo-, mono-n-propoxy-, tetraphenoxy-1,3,5-triazatriphosphorine; monochloro-, mono-n-butoxy-, tetraphenyl-1,3,5-triazatriphosphorine; monochloro-, monomethoxy-, tetra(dimethylamino) - 1,3,5-triazatriphosphorine; monochloro-, monoethoxy-, tetra(dibutylamino)-1,3,5-triazatriphosphorine; monochloro-, monomethoxy-, tetra(dipropylamino) - 1,3,5 - triazatriphosphorine; monobromo-, monoethoxy-, tetra(diethylamino) - 1,3,5 - triazatriphosphorine; monochloro-, monoethoxy-, diphenyl-, diphenoxy - 1,3,5 - triazatriphosphorine; monochloro-, monoethoxy-, diphenyl-, di(dimethylamino)-1,3,5-triazatriphosphorine; and monobromo-, monoethoxy-, diphenyl-diphenoxy-1,3,5-triazatriphosphorine.

When such a monohalo-, monoalkoxy-1,3,5-triazatriphosphorine compound, in which the other four substitutable positions on the nucleus are occupied by one or more of the types of said blocking groups, is subjected to condensation polymerization conditions, intermolecular elimination of alkyl halide occurs and adjacent triazatriphosphorine nuclei becomes linked by P—O—P linkages joining phosphorous atoms on adjacent triazatriphosphorine nuclei to form a thermoplastic, linear polymer in which the principal chains are purely inorganic. Thus, for instance, when monochloro-, monoethoxy-, tetraphenoxy-1,3,5-triazatriphosphorine is subjected to condensation polymerization conditions, ethyl chloride is eliminated from adjacent triazatriphosphorine nuclei, leaving the phosphorus atoms of those nuclei linked with P—O—P linkage. These polymers contain no organic groups as part of the principal chains, although they do contain organic substituents (phenoxy groups in the case of the example) on the ring nuclei. The exclusively inorganic nature of the principal chains (or "backbones") of these molecules endows the polymers with exceptional physical properties, notably excellent resistance to high temperatures, to oxidation, to being ignited and to supporting combustion. These polymers are highly useful materials for the making of insulators for electrical motors which are to be used in high temperature service.

It will be noted that any of the compounds recited above can exist as either the geminal or non-geminal isomer. Although it has been found that a mixture of these two isomers is actually formed in the preparation of many of these compounds, no marked difference in the reactivity of these isomers has been observed and both, or a mixture of both, are equally suitable for the purposes of this invention.

The compounds described so far will produce linear polymers upon being subjected to condensation polymerization conditions, because each is difunctional. Where it is desired to produce a polymer with a given degree of three-dimensional structure, a controlled amount of cross-linking can be produced by including with the starting material a controlled amount of trifunctional monomer. These trifunctional monomers are 1,3,5-triazatriphosphorine nuclei on which three of the substitutable positions are occupied by blocking groups of one or more of the types described above, and the other three positions are occupied by a combination of halo and alkoxy groups. Examples of compounds of this invention which are trifunctional are monochloro-, diethoxy-, triphenyl-1,3,5-triazatriphosphorine; dichloro-, monoethoxy-, triphenoxy-1,3,5-triazatriphosphorine; dichloro-, monoethoxy-, tri(dimethylamino) - 1,3,5-triazatriphosphorine; dibromo-, monoethoxy-, triphenoxy - 1,3,5 - triazatriphosphorine; monobromo-, monochloro-, monoethoxy-, triphenoxy-1,3,5-triazatriphosphorine; monobromo-, dimethoxy-, triphenyl-1,3,5-triazatriphosphorine; and monochloro-, diethoxy-, tri(dibutylamino)-1,3,5-triazatriphosphorine.

The amount of tri-functional material to be added to the difuctional material of this invention will depend on the degree of cross-linking desired in the polymer, which will be apparent to one skilled in the art by analogy to the correlation between the degree of cross-linking and physical properties found with organic polymers. However, to obtain managable polymers it will invariably be found necessary to use a lesser amount of trifunctional material with a major amount of difunctional material. Inasmuch as each molecular species of tri-functional material will contain a disproportionate number of halo and alkoxy substitutents, the ratio of the total number of alkoxy to the total number of halogen groups in the starting material must be controlled. Although the condensation polymerization reaction will proceed satisfactorily when this ratio of alkoxy to halogen groups in the starting material is anywhere between one to two and two to one, best results are obtained when the ratio of these groups in the starting material is substantially one to one. When a starting material containing a preponderance of halo substituents over alkoxy substituents is used, an undesirable side reaction by which hydrogen halide is formed tends to occur. The magnitude of this side reaction is proportional to the excess of halo substituents over alkoxy substituents in the starting material. If the starting material contains an excess of alkoxy substituents over halo substituents, the polymer formed is found to have relatively poor thermal stability. The decrease in thermal stability of the polymer is proportional to the excess of alkoxy substituents over halo substituents in the starting material. These respective deleterious effects become so pronounced as to make it undesirable to practice this process on starting materials wherein the ratio of alkoxy to halo substituents is outside of the range of 2:1 to 1:2.

The compounds of my invention are all hexa-substituted 1,3,5-triazatriphosphorines having the empirical formula $P_3N_3Y_3X(OR)Z$, wherein Y is a blocking group selected from the class consisting of phenyl groups, phenoxy groups and dialkyl amino groups in which each alkyl group has from 1–4 carbon atoms, wherein X is a halo radical, wherein OR is an alkoxy radical containing from 1–4 carbon atoms, and wherein Z is a group selected from the class consisting of the said blocking groups, the said halo radical and the said alkoxy radical.

PREPARATION OF MONOMER COMPOUNDS
OF THIS INVENTION

The monomer compounds of this invention can best be prepared from the suitable phosphonitrilic halide trimer. For the chloro compounds, commercially available phosphonitrilic chloride trimer, 2,2,4,4,6,6-hexachloro-1,3,5-triazatriphosphorine ($P_3N_3Cl$ ) is the most convenient starting material. For the bromo compounds, the corresponding phosphonitrilic bromide trimer 2,2,4,4,-6,6-hexabromo-1,3,5-triazatriphosphorine ($P_3N_3Br_6$) is the most useful starting material. The procedure used will depend upon which of the blocking groups is to be placed on the molecule. In order to substitute some of the halide radicals with phenyl groups, a Friedel-Crafts reaction is used. Example 1 illustrates the use of that reaction to prepare 1,3,5-triazatriphosphorines partially or fully blocked with phenyl groups.

The preparation of monomer compounds of this invention containing phenoxy blocking groups can be accomplished by a reaction of the suitable 1,3,5-triazatriphosphorine halide with phenol catalyzed with triethylamine as illustrated in Example 2, or by the reaction of the 1,3,5-triazatriphosphorine haldie with sodium phenoxide as illustrated in Example 3.

The monomer compounds of this invention blocked with dialkylamino groups can be prepared by reacting the suitable 1,3,5-triazatriphosphorine halide with the dialkylamine which is to form the blocking groups in a diethylether medium. Example 4 illustrates this reaction where dimethylamine is the substituent.

Preparation of the monomer compounds of this invention is completed by alkoxylating a suitably blocked 1,3,5-triazatriphosphorine halide by reacting it with the desired sodium alkoxide in a solvent medium. Example 5 is an illustration of this procedure wherein sodium ethoxide is used to replace a halo radical on a 1,3,5-triazatriphosphorine nucleus with an ethoxy group.

*Example 1.*—Friedel-Crafts reaction between phosphonitrilic chloride trimer ($P_3N_3Cl_6$) and benzene replaces a portion of the chloro substituents on the 1,3,5-triazatriphosphorine nucleus with phenyl groups. A reaction flask is charged with 100 parts by weight of $P_3N_3Cl_6$, 81 parts by weight of $AlCl_3$ and 345 parts by weight of benzene which has previously been purified by passing it through a column of activated charcoal and alumina and which has subsequently been stored over sodium-lead alloy under argon. The reaction mixture is stirred at reflux in a nitrogen atmosphere for 72 hours, and then is poued into a mixture of 286 by weight of crushed ice and 160 parts by weight of 6 N HCl. The benzene layer is separated, washed with distilled water, then with sodium bicarbonate solution, and again with distilled water and is dried over 4A molecular sieves, treated with activated carbon and filtered. The benzene is removed by evaporation, giving 100 parts by weight of crude produce. Unreacted $P_3N_3Cl_6$ is removed by sublimation, leaving 67 parts by weight of $P_3N_3(C_6H_5)_2Cl_4$. This material can be further purified by recrystallization from petroleum ether.

The same reaction will yield the tetraphenyl-substituted compound $P_3N_3(C_6H_5)_4Cl_2$ if conducted for a sufficiently long period.

*Example 2.*—Reaction between 1,3,5-triazatriphosphorine halide and phenol catalyzed with triethylamine yields a phenoxy-substituted compound. A reactor equipped with stirrer and reflux condenser is charged with a know amount of $P_3N_3Cl_6$, approximately five times that weight of acetone, and a quantity of phenol equivalent to six moles per mole of $P_3N_3Cl_6$. With stirring, six moles of dry triethylamine per mole of $P_3N_3Cl_6$ are added rapidly while a nitrogen atmosphere is kept over the reaction mixture. The mixture is then refluxed for two hours. The acetone and excess triethylamine are removed by distillation, and the residue is taken up in benzene. The triethylamine-hydrochloride is filtered off. The filtrate is washed free of phenol with sodium carbonate solution, rinsed with distilled water, treated with activated charcoal, and dried with 4A molecular sieve. The benzene is removed by evaporation. The product is a yellow oil, which when decolorized with neutral alumina is identified as $P_3N_3(OC_6H_5)_3Cl_3$.

*Example 3.*—Substitution of phenoxy groups for halo groups on the 1,3,5-triazatriphosphorine nucleus is accomplished by reaction with sodium phenoxide. A reactor equipped with stirrer and reflux condenser is charged with the required amount of substituted 1,3,5-triazatriphosphorine. Approximately 15 times that weight of solvent is added, followed by the addition of 1 gram-mole of soduim phenoxide for each mole of halogen to be replaced. The mixture is then allowed to stand at room temperature for 24 to 48 hours, and is then heated at reflux for several hours. The product is then filtered to remove sodium chloride, and is purified as in the preceding example. The quantity of sodium chloride collected indicates that the reaction has proceeded to completion. Various solvents can be used in carrying out the reaction. The reaction is relatively slow but highly selective in ethanol, and some ethoxy substitution occurs which must be compensated for in subsequent steps of the synthesis. In other solvents, such as acetone, ethylene glycol, dimethyl ether, and tetrahydrofuran, fewer side reactions occur but the reaction is less selective and the product contains a broader mixture of derivatives.

Where the starting material for this phenoxy substitution reaction contains fewer than six substituent halogens per 1,3,5-triazatriphosphorine nucleus, it is sometimes found that the reaction time must be increased, sometimes up to 60 hours at reflux temperature.

*Example 4.*—This example illustrates the substitution of halo-substituted 1,3,5-triazatriphosphorine molecules with dialkylamino groups. A weighed quantity of halo-substituted 1,3,5-triazatriphosphorine is placed in a reactor fitted with a stirrer and dropping funnel, the assembly being cooled in an ice bath. Diethyl ether in an amount equal to approximately 10 times the weight of the triazatriphosphorine is added, and then two gram-moles of dimethylamine are added for each equivalent of halo substituent to be replaced. The dimethylamine is added slowly from the dropping funnel in the form of a 25% aqueous solution. The reaction mixture is stirred at 0° C. for several hours and is then allowed to warm to room temperature. The ether layer is separated, washed with water, and dried with 4A molecular sieves. The ether is removed by evaporation, yielding either an oily product or a solid product, depending upon the amount of substitution accomplished.

Other dialkylamino substitutions are accomplished by using the appropriate dialkylamine in the above reaction

*Example 5.*—This example illustrates the alkoxylation of substituted triazatriphosphorine compounds. This procedure is applicable to 1,3,5-triazatriphosphorines on which all of the substituents are halo radicals as well as to those on which some of the substituents are other than halo radicals, for instance where these substituents are any of the blocking groups described above. A weighed quantity of the triazatriphosphorine is charged to a reactor equipped with a stirrer and reflux condenser under a blanket of nitrogen. Solvent in an amount approximately equal to 10 times the weight of the triazatriphosphorine is added, and a gram-mole of sodium ethoxide is added for each mole of halogen to be replaced. The solution is heated at reflux for the length of time necessary to complete the reaction, which can be up to 60 hours. The product is isolated from the reaction medium in essentially the same way as described for the product prepared in the amine-catalyzed phenoxidation (Example 3), omitting the sodium carbonate wash. A colorless oily material is produced.

Selection of the solvent for this reaction depends upon the reactivity of the halogen to be replaced and is not otherwise critical. Ethanol is satisfactory for chlorine, which is easily replaceable, whereas diethylene glycol dimethyl ether is generally advisable for the less reactive derivatives.

For substitution with alkoxy groups other than ethoxy, the suitable sodium alkoxide is used in place of the sodium ethoxide of the foregoing procedure.

POLYMERIZATION

The monomeric materials of this invention can be polymerized in a condensation polymerization reaction in which alkyl halide is eliminated from adjacent molecules, leaving the phosphorus atoms on adjacent triazatriphosphorine nuclei linked with P—O—P linkages.

The same polymers can also be formed by interpolymerizing dihalo-substituted 1,3,5 - triazatriphosphorines on which the other four substitutable positions are occupied by any of the blocking groups described above with dialkoxy-substituted triazatriphosphorine nuclei on which the other four substitutable positions are occupied by the said blocking groups. Again alkyl halide is intermolecularly eliminated from adjacent molecules to leave the phosphorus atoms of adjacent nuclei linked with P—O—P linkages. Of course, the interpolymerization of dialkoxy substituted 1,3,5 - triazatriphosphorines with dihalo-substituted - 1,3,5-triazatriphosphorines on which all of the other substitutable positions are occupied by blocking groups will again yield a totally linear polymer. And again, the desired degree of cross-linking in the polymer can be achieved by introducing a certain amount of trifunctional material, the requirements as to the ratio of the total number of halo substituents to the total number of alkoxy substituents, as previously explained, apply in the case of interpolymerization as well.

In order to obtain high molecular weight polymer by the interpolymerization of halo-substituted species with alkoxy-substituted species the mole ratio of halo groups to 1,3,5-triazatriphosphorine nuclei in the starting material must be at least 1:1 and the mole ratio of alkoxy groups to 1,3,5-triazatriphosphorine nuclei in the starting material must also be at least 1:1.

The polymerization process of this invention embraces the reaction, under condensation polymerization conditions, of any species or mixture of species of hexa-substituted 1,3,5-triazatriphosphorines wherein from 3 to 4 of the substituents on each 1,3,5 - triazatriphosphorine nucleus are blocking groups from any of the classes described, which include phenyl groups, phenoxy groups and dialkylamino groups in which each alkyl group contains from 1 to 4 carbon atoms, preferably dimethylamino, and wherein the remaining substituents on each nucleus are either halo groups, preferably chloro or bromo, or alkoxy groups, each containing from 1 to 4 carbon atoms, preferably ethoxy, the mole ratio of the halo groups present to the alkoxy groups present in the starting material being in the range of from 1 to 2 to 2 to 1, and preferably being essentially 1 to 1, whereby alkyl halide is eliminated to form a polymer joined by P—O—P linkages between phosphorus atoms of adjacent triazatriphosphorine nuclei. The degree of cross-linking obtainb in the polymer by this process will depend upon the amount of trifunctional species present in the starting material. However, in order to obtain a workable polymer the major proportion of the starting material must be a difunctional material, with the trifunctional material forming only a minor proportion or amount of the starting material.

The condensation polymerization reaction is achieved by the mere application of heat. No catalyst is required. The selected 1,3,5 - triazatriphosphorine or mixture of 1,3,5-triazatriphosphorines is heated in an inert atmosphere in a reactor fitted with a stirrer. Where the reactive substituents are ethoxy and chloro, the evolution of ethyl chloride begins at 250° C., indicating incipient reaction. The rate of the reaction increases with increasing temperature, and becomes quite rapid at 270° C. to 300° C. After 1 to 5 hours of reaction at 270° C. to 300° C., the viscosity of the material increases markedly. The product solidifies upon cooling.

It is convenient to prepare a low molecular weight prepolymer which melts at 60 to 100° C. and is soluble in the common organic solvents such as acetone, methyl ethyl ketone, carbon tetrachloride and benzene. This prepolymer can then conveniently be shaped to the form of the desired finished object. Upon further heating for 1 to 5 hours at 350° C., further polymerization with the evolution of only small additional quantities of alkyl halide results, yielding a clear, hard, resinous product. The degree of cross-linking is, of course, a function of the proportion of trifunctional material present in the starting material. The shaping of the prepolymer can be achieved by any of the standard procedures of molding, casting, depositing from solution, etc. which are familiar to those skilled in the art of shaping organic polymers.

The practice of my invention is further demonstrated by the following examples:

*Example 6.*—2,2,4,4,6,6-hexachloro-1,3,5-triazatriphosphorine ($P_3N_3Cl_6$) was reacted with four moles of sodium phenoxide in ethanol as in Example 3. Some ethoxy-substitution took place, and the light-colored oil that was isolated had the over-all composition $$P_3N_3(OC_6H_5)_{3.5}(OC_2H_5)_{0.5}Cl_2$$

indicating a 1 to 1 mixture of $P_3N_3(OC_6H_5)_4Cl_2$ and $P_3N_3(OC_6H_5)_3(OC_2H_5)Cl_2$.

The oil was further reacted with 0.75 equivalents of sodium ethoxide as in Example 5, yielding a polymerizable, light-colored, viscous liquid product with the over-all composition $P_3N_3(OC_6H_5)_{3.5}(OC_2H_5)_{1.25}Cl_{1.25}$. A sample of this material was heated at 270–300° C. for one hour, losing 11.7% of its weight and yielding a clear, solid prepolymer which was soluble in common organic solvents, including benzene. The prepolymer melted at about 60° C. When $P_3N_3(OC_6H_5)_{3.5}(OC_2H_5)_{1.25}Cl_{1.25}$ was heated for two hours at 350° C., it lost 20.5% of its weight and yielded a clear, light-colored, hard, cross-linked and insoluble resin which softened at about 180° C. but did not melt even at 300° C. No acidic by products were found during polymerization, but ethyl chloride was evolved.

The polymer was stable at high temperatures as shown by the fact that the product lost less than 1% of its weight on heating for hour hours at 350° C., and was unchanged in appearance.

*Example 7.*—The reaction product, $P_3N_3(OC_6H_5)_{3.5}(OC_2H_5)_{0.5}Cl_2$ from Example 6, was reacted with 1.5 moles of sodium ethoxide in ethanol as in Example 5. The product which was isolated had the composition $P_3N_3(OC_6H_5)_{3.5}(OC_2H_5)_{2.0}Cl_{0.5}$.

An equimolar mixture of $P_3N_3(OC_6H_5)_{3.5}(OC_2H_5)_{2.0}Cl_{0.5}$ and $P_3N_3(OC_6H_5)_{3.5}(OC_2H_5)_{0.5}Cl_2$ was then prepared and polymerized at 300° C. for one hour. Ethyl chloride was evolved, but no acidic by-products were detected. The resulting product was a hard, clear, light-colored solid which melted at 100° C.

*Example 8.*—2,2,4,4,6,6 - hexachloro - 1,3,5 - triazatriphosphorine, $P_3N_3Cl_6$, was reacted with three equivalents of phenol using triethylamine as catalyst as in Example 2. The isolated product, $P_3N_3(OC_6H_5)_3Cl_3$, was then reacted with excess sodium ethoxide in ethanol as in Example 5, yielding $P_3N_3(OC_6H_5)_3(OC_2H_5)_3$.

Equimolar amounts of $P_3N_3(OC_6H_5)_3Cl_3$ and $P_3N_3(OC_6H_5)_3(OC_2H_5)_3$ were then mixed together and polymerized at 350° C. A resinous product similar to those described in Examples 6 and 7 was obtained, although some acidic by-products were obtained.

*Example 9.*—A sample of $P_3N_3(OC_6H_5)_3Cl_3$, prepared as in Example 2, was reacted with one gram mole of sodium phenoxide per gram mole of $P_3N_3(OC_6H_5)_3Cl_3$ as in Example 3. The isolated product was analyzed and found to be $P_3N_3(OC_6H_5)_4Cl_2$, and was substantially free of ethoxy groups.

A portion of this product was reacted with an excess of sodium ethoxide by the method described in Example 5, yielding a product which analyzed as $P_3N_3(OC_6H_5)_4(OC_2H_5)_2$.

Equimolar amounts of $P_3N_3(OC_6H_5)_4Cl_2$ and $P_3N_3(OC_6H_5)_4(OC_2H_5)_2$ were then mixed together and subjected to thermal polymerization at 350° C. A clear, hard, soluble resin was obtained.

*Example 10.*—2,2,4,4,6,6-hexachloro - 1,3,5 - triazatriphosphorine, $P_3N_3Cl_6$, was subjected to Friedel-Crafts phenylation as in Example 1, yieldnig the diphenyl derivative $P_3N_3(C_6H_5)_2Cl_4$. This derivative was reacted with dimethylamine according to Procedure D yielding pure, crystalline $P_3N_3(C_6H_5)_2[N(CH_3)_2]_2Cl_2$.

Analysis for $P_3N_3(C_6H_5)_2[N(CH_3)_2]_2Cl_2$:

|  | Calculated | Found |
| --- | --- | --- |
| Percent carbon | 42.87 | 42.63 |
| Percent hydrogen | 4.95 | 4.65 |
| Percent nitrogen | 15.63 | 15.33 |
| Percent phosphorus | 20.73 | 20.49 |
| Percent chlorine | 15.82 | 15.97 |

Finally, a portion of this latter derivative was reacted with sodium ethoxide as in Example 5 to yield an oil that was shown by analysis to be $P_3N_3(C_6H_5)_2[N(CH_3)_2]_2(OC_2H_5)_2$.

The $P_3N_3(C_6H_5)_2[N(CH_3)_2]_2Cl_2$ and $P_3N_3(C_6H_5)_2[N(CH_3)_2]_2(OC_2H_5)_2$ were then mixed together in equimolar amounts and heated at 350° C. A hard, clear, soluble polymer formed that was, however, darker in color than the polymers formed from derivatives without amine substituents.

*Example 11.*—One gram mole of $P_3N_3(OC_6H_5)_4Cl_2$, prepared as in Example 9, was reacted with one gram mole of sodium ethoxide as in Example 5. The isolated product was found to be $P_3N_3(OC_6H_5)_4(OC_2H_5)Cl$. When this material was heated to 350° C., a hard, clear, soluble polymer of the composition $[P_3N_3(OC_6H_5)O]_n$ was obtained. Ethyl chloride was evolved during the polymerization process.

*Example 12.*—A material having the composition $P_3N_3(C_6H_5)_4Cl_2$ was prepared by conducting the Friedel-Crafts reaction of Example 1 for a period of six weeks. This material was then reacted, mole for mole, with sodium ethoxide as in Example 5 to form a product identified as $P_3N_3(C_6H_5)_4(OC_2H_5)Cl$. When this material was heated to 350° C., a hard, clear, soluble polymer of the composition $[P_3N_3(C_6H_5)O]_n$ was obtained with evolution of ethyl chloride.

*Example 13.*—$P_3N_3[(CH_3)_2N]_4Cl_2$ was prepared from $P_3N_3Cl_6$ by the process of Example 4 and was converted to $P_3N_3[(CH_3)_2N]_4(OC_2H_5)Cl$ by the reaction of Example 5. By heating this material to 350° C., a hard, clear, soluble polymer having the composition $$\{P_3N_3[(CH_3)_2N]_4O\}_n$$

was formed with the evolution of ethyl chloride.

Having thus described my invention, what I claim and desire to protect by Letters Patent is:

1. A hexa-substituted 1,3,5-triazatriphosphorine having the empirical formula $P_3N_3Y_3X(OR)Z$, wherein Y is a blocking group selected from the class consisting of phenyl groups, phenoxy groups, and dialkylamino groups in which each alkyl group has from 1 to 4 carbon atoms, wherein X is a halo radically selected from the class consisting of chloro and bromo radicals, wherein OR is an alkoxy radical containing from 1 to 4 carbon atoms, and wherein Z is a group selected from the class consisting of the said blocking groups, the said halo radical and the said alkoxy radical.

2. A hexa-substituted 1,3,5-triazatriphosphorine wherein four of the substituents are blocking groups selected from the class consisting of phenyl, phenoxy and dimethylamino groups, one of the substituents is a halide selected from the class consisting of chloro and bromo radicals, and one of the substituents is an alkoxy radical containing from 1 to 4 carbon atoms.

3. Monochloro-, monoethoxy-, tetraphenoxy-1,3,5-triazatriphosphorine.

4. Monochloro-, monoethoxy-, tetraphenyl-1,3,5-triazatriphosphorine.

5. Monochloro-, monoethoxy-, tetra(dimethylamino)-1,3,5-triazatriphosphorine.

6. The condensation polymerization process comprising reacting at a temperature of at least 250° C. at least one species of hexa-substituted 1,3,5-triazatriphosphorine wherein from 3 to 4 of the substituents on each nucleus are blocking groups selected from the class consisting of phenyl groups, phenoxy groups and dialkylamino groups in which each alkyl group contains from 1 to 4 carbon atoms, and wherein the remaining substituents on each nucleus are selected from the class consisting of halo groups selected from the class consisting of chloro and bromo radicals and alkoxy groups each containing from 1 to 4 carbon atoms, the mole ratio of said halo groups to said alkoxy groups present in the starting material being in the range of from 1:2 to 2:1, and the mole ratio of halo groups to 1,3,5-triazatriphosphorine nuclei and the mole ratio of alkoxy groups to 1,3,5-triazatriphosphorine nuclei in the starting material each being at least 1:1, whereby alkyl halide is eliminated to form a polymer joined by P–O–P linkages between phosphorus atoms of adjacent triazatriphosphorine nuclei.

7. The process of claim 6 wherein said halo and said alkoxy groups are present in the starting material in a mole ratio of substantially 1 to 1.

8. The process of reacting hexa-substituted monohalo-, monoalkoxy-, 1,3,5-triazatriphosphorines having all of the other substitutable positions occupied by groups selected from the class consisting of phenyl groups, phenoxy groups and dialkylamino groups in which each alkyl group contains from 1 to 4 carbon atoms, wherein the halo radical is selected from the class consisting of chloro and bromo, and wherein the alkoxy substituent contains from 1 to 4 carbon atoms, at a temperature of at least 250° C. to form a thermoplastic polymer.

9. The process of reacting a major amount of hexa-substituted 1,3,5-triazatriphosphorine wherein four of the substitutable positions on each nucleus are occupied by blocking groups selected from the class consisting of phenyl groups, phenoxy groups, and dimethylamino groups and a minor amount of hexa-substituted 1,3,5-triazatriphosphorine wherein 3 of the substitutable positions are occupied by said blocking groups, the remaining substitutable positions on all of the 1,3,5-triazatriphosphorine nuclei being occupied by groups selected from the class consisting of chloro, bromo and alkoxy groups, the total number of said chloro and bromo groups and phorine nuclei being occupied by groups selected from the total number of said alkoxy groups benig present in a ratio of substantially 1, by heating to at least 250° C. whereby alkyl halide is eliminated to form a polymer wherein phosphorus atoms on adjacent 1,3,5-triazatriphosphorine nuclei are linked by P–O–P linkages.

10. The process of reacting monochloro-, monoethoxy-, tetraphenoxy-1,3,5-triazatriphosphorine by heating to at least 250° C. to cause the intermolecular elimination of ethyl chloride and the formation of a polymer wherein phosphorus atoms on adjacent triazatriphosphorine nuclei are joined by P–O–P linkages.

11. The process of reacting monochloro-, monoethoxy-, tetraphenyl-1,3,5-triazatriphosphorine by heating to at least 250° C. to cause the intermolecular elimination of ethyl chloride and the formation of a polymer wherein phosphorus atoms on adjacent triazatriphosphorine nuclei are joined by P–O–P linkages.

12. The process of reacting monochloro-, monoethoxy-, tetra(dimethylamino)-1,3,5-triazatriphosphorine by heating to at least 250° C. to cause the intermolecular elimination of ethyl chloride and the formation of a polymer wherein phosphorus atoms on adjacent triazatriphosphorine nuclei are joined by P–O–P linkages.

13. A low molecular weight prepolymer having a melting point of 60–100° C. prepared according to the process of claim 6.

14. A hard, clear polymer having a melting point in excess of 300° C. prepared according to the process of claim 6.

15. A linear thermoplastic polymer prepared according to the process of claim 8.

16. A hard, clear, insoluble polymer with a controlled degree of cross-linking prepared according to the process of claim 9.

17. Poly(tetraphenoxy - 1,3,5 - triazatriphosphorine)-ether prepared according to the process of claim 11.

18. Poly[tetra(dimethylamino) - 1,3,5 - triazatriphosphorine]ether prepared according to the process of claim 12.

References Cited

Garner et al.: "Phosphonitrilic Polymers Stable at High Temperatures," OTS Report AD 428 598 (April 20, 1964), pp. 2, 3, 9–17, 20 and 26.

SAMUEL H. BLECH, *Primary Examiner.*

U.S. Cl. X.R.

260—47, 927, 61, 32.8, 33.6, 33.8